April 3, 1956  W. J. McCUNE, JR  2,740,341
PHOTOGRAHIC APPARATUS

Filed Sept. 27, 1952  3 Sheets-Sheet 1

INVENTOR
William J. McCune, Jr.
Browand Mikulka
and
BY Gerald Altman
ATTORNEYS

United States Patent Office 2,740,341
Patented Apr. 3, 1956

2,740,341

PHOTOGRAPHIC APPARATUS

William J. McCune, Jr., South Lincoln, Mass., assignor to Polaroid Corporation, Cambridge, Mass., a corporation of Delaware Application September 27, 1952, Serial No. 311,849

9 Claims. (Cl. 95—13)

This invention relates to photography and more particularly to photographic apparatus wherein a photosensitive sheet is exposed and thereafter processed by superposing the sheet on another sheet and spreading a processing composition between the sheets.

An object of the present invention is to provide, in a photographic processing apparatus of the type having a pair of pressure-applying members between which a photosensitive sheet and another sheet may be advanced in superposed relation with a layer of processing composition therebetween, novel means for predeterminedly arranging the pressure-applying members with respect to each other.

Other objects of the invention are: to provide photographic apparatus comprising a housing, a pair of pressure-applying rollers, a first mounting means for mounting one of the rollers, a second mounting means for mounting the other of the rollers, the first and second mounting means being movable with respect to each other, and aligning means for so arranging the rollers with respect to each other that their axes are parallel when the first and second mounting means are in predetermined relative positions, the aligning means acting to compensate for structural inaccuracies in the housing and in the first and second mounting means; to provide photographic apparatus of the above type wherein one of the rollers includes shaft means so mounted as to permit movement of the one roller with respect to its mounting means and wherein the other of the mounting means has attached thereto at least one finger which is adapted to abut against the shaft means in order to so predeterminedly arrange the pressure-applying rollers with respect to each other that their axes are parallel; and to provide photographic apparatus of the above type which, by virtue of the foregoing construction, is economical to manufacture and simple to operate.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
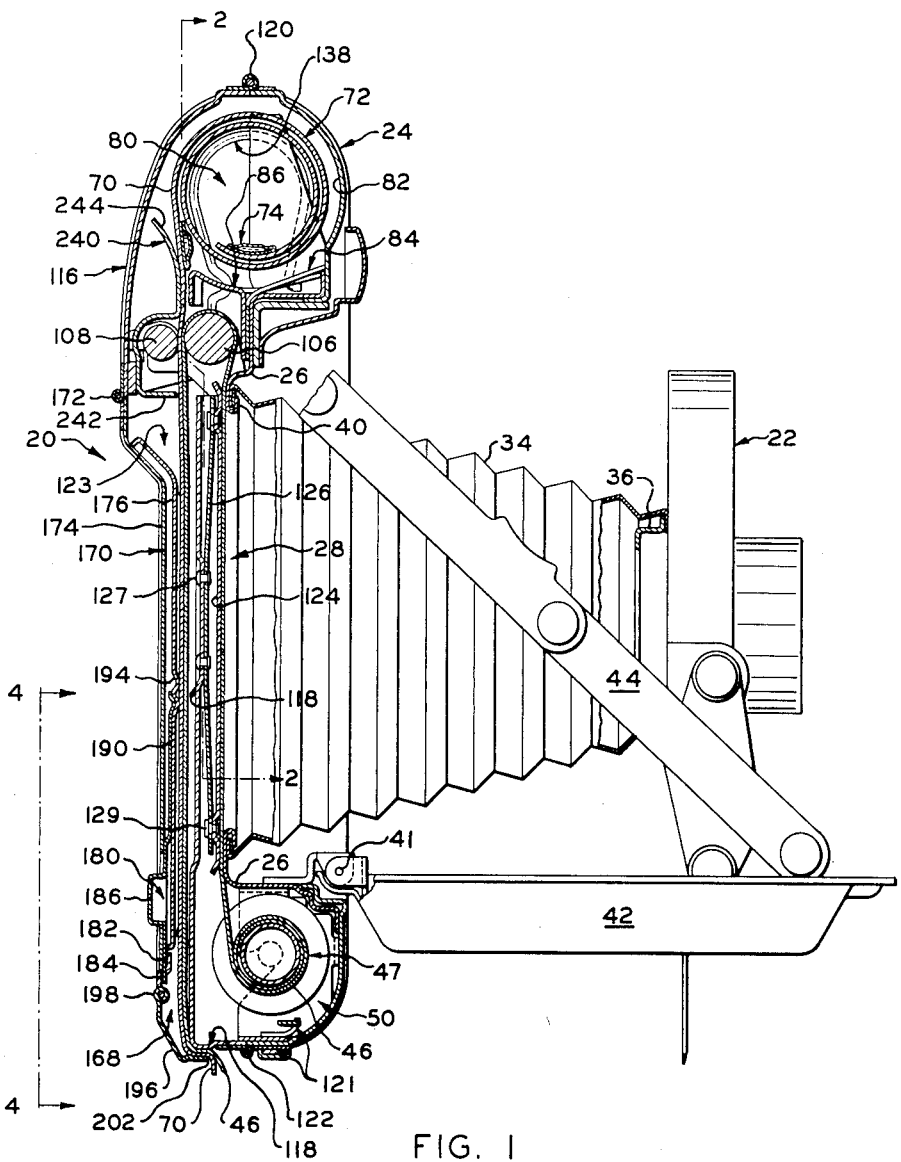
Figure 1 is a diagrammatic, fragmentary view, partly in section, of a handheld camera embodying the herein disclosed invention with a photosensitive sheet and another sheet mounted therein, the section being taken along a line midway between the sides of the camera.

Photographic apparatus of the type herein illustrated generally includes means for processing an exposed photosensitive sheet by superposing said photosensitive sheet on another sheet and by spreading a thin layer of processing composition between said sheets. The photosensitive sheet may comprise a silver halide layer. In one form thereof, the second sheet comprises a silver precipitating layer. The processing composition, by way of example, may comprise a developer, a silver halide solvent and an alkali. In practice, superposition of said sheets with a thin layer of processing composition therebetween is accomplished by advancing said sheets between a pair of pressure-applying members. The result of this procedure is to develop the latent image on the photosensitive sheet to silver and to form in a frame of the photosensitive sheet a soluble silver complex from unexposed silver halide for transfer to the other sheet. This complex, at least in part, may be transferred by imbibition to a frame of the other sheet where it may be developed to silver to produce a positive image.

The photographic process and various species of photosensitive and other sheets herein referred to are described in detail in Patent No. 2,543,181, issued to Edwin H. Land on February 27, 1951, for Photographic Product Comprising a Rupturable Container Carrying a Photographic Processing Liquid. It is, of course, to be understood that the apparatus herein described is not limited to use with any particular species of photosensitive or other sheets, the terms "photosensitive sheet" and "other sheet" being used in their broadest sense to indicate a first sheet which is photosensitive and a second sheet which merely may aid in spreading the processing composition over the surface of the photosensitive sheet or which may, if desired, possess other characteristics.

Generally, the embodiment of the herein disclosed invention illustrated in the accompanying drawings is a handheld camera in which there is provided an exposure chamber and a processing chamber. Successive portions of a photosensitive sheet may be successively positioned within the exposure chamber in order that they may be successively photoexposed. At the entrance to the processing chamber there is provided a pair of pressure-applying rollers which are adapted to receive therebetween the photosensitive sheet from the exposure chamber and to superpose and register the photosensitive sheet with another sheet. The other sheet has on one surface thereof a succession of image-receiving areas which are registrable with the frames and has affixed thereto a succession of containers of processing composition, one container being associated with one image-receiving area. When the sheets are advanced in superposed relation between the pressure-applying rollers, processing composition is ejected from a container and is spread in a thin layer between a frame of the photosensitive sheet and an image-receiving area of the other sheet, thereby forming a sandwich which advances into the processing chamber. A stop means is provided for arresting advancement of the sandwich when one frame and the image-receiving area with which it is registered have advanced entirely between the rollers. The aforementioned frame and area are allowed to remain in the processing chamber for a predetermined time during which the latent image in the frame is developed and a positive print is formed in the image-receiving area with which said frame is registered. At the end of the predetermined time, the processing chamber may be opened and the developed positive print may be removed.

Referring now to the drawings, wherein like numerals denote like parts, there is shown in Fig. 1 a handheld camera of the folding type which embodies the present invention. A handheld camera of this type is disclosed in the copending application of Herbert A. Bing and James E. Hunter, Jr., Serial No. 277,672, filed March 20, 1952, for Photographic Apparatus. As a means for supporting and enclosing the various components of the camera, a housing, generally designated by 20, is provided. Associated with housing 20 is a suitable lens and shutter assembly 22 which may be of conventional design but which preferably is of the type disclosed in Patent No. 2,531,936, issued to Murry N. Fairbank and Sidney B. Whittier on November 28, 1950, for Camera Shutter Mechanism. In the form shown, housing 20 comprises a front portion 24 which provides a central re-entrant section 26 having a light-transmitting aperture 28. Section 26 further provides guide surfaces surrounding aperture 28 and which serve to position a photosensitive sheet for exposure in the focal surface of the lens of assembly 22. A suitable bellows 34 provides an optical path from the lens of assembly 22 to a photosensitive sheet positioned adjacent to aperture 28. One end of bellows 34 is fastened in lighttight fashion to assembly 22 by such means as a centrally apertured, dish-out, clamping plate 36 suitably connected to assembly 22. The other end of bellows 34 is fastened in lighttight fashion to re-entrant section 26 by such means as in-turned clamping flanges 40. Pivotally mounted on front portion 24, as at 41, is a bed 42 which is adapted to support assembly 22 when in open position and which, in conjunction with re-entrant section 26, encloses and protects assembly 22 when in closed position. A suitable linkage, designated generally by 44, is provided for erecting assembly 22 when bed 42 is in open position.

One example of a supply of photosensitive sheet that is adapted to be exposed and processed within the illustrated camera is shown in Fig. 1 as being mounted within housing 20. This supply includes a photosensitive sheet 46 which preferably comprises a suitable base and a suitable photosensitive layer on one side of the base. The photosensitive layer, for example, may be composed of a silver halide emulsion and is provided with a succession of frames that are adapted to receive a succession of latent images upon photoexposure. The supply of sheet 46 is carried by a spool 47 of conventional design having a spindle around which sheet 46 is coiled, a pair of disks adjacent to opposite ends of the spindle for aligning the successive convolutions of sheet 46, and a pair of stub shafts extending from opposite ends of the spool.

As a means for mounting the supply of photosensitive sheet, there is provided a U-shaped member 50 having a bight portion which is secured to the lower edge of front portion 24 and a pair of legs which are positioned adjacent to opposite edges of front portion 24. These legs are provided with slots that are adapted to seat the stub shafts of spool 47. A drag spring (not shown), the central portion of which may be secured to the bight portion of U-shaped member 50 and the ends of which may be adapted to engage the disks, may be provided.

Another sheet 70, in conjunction with which photosensitive sheet 46 may be processed, is shown in Fig. 1 as being supplied from a roll 72. Sheet 70 preferably comprises a suitable base and a suitable image-receiving layer on one side of the base. The image-receiving layer, for example, may comprise one of the compositions, now well known in the art, which adapt it to receive, in successive image-receiving areas thereof, positive prints of the latent images in frames of photosensitive sheet 46. A succession of containers, designated generally by 74 in the illustrated embodiment, are provided for carrying a liquid processing composition. As shown, containers 74 are affixed to the image-receiving layer of sheet 70 at substantially regularly spaced intervals from a location adjacent a leading end thereof toward the trailing end thereof, containers 74 being so spaced that one container is associated with one image-receiving area. Each container is provided with a rupturable mouth, facing the trailing end of sheet 70, which mouth is adapted to eject processing composition when opposed compressional forces are applied to container 74.

Figure 2:
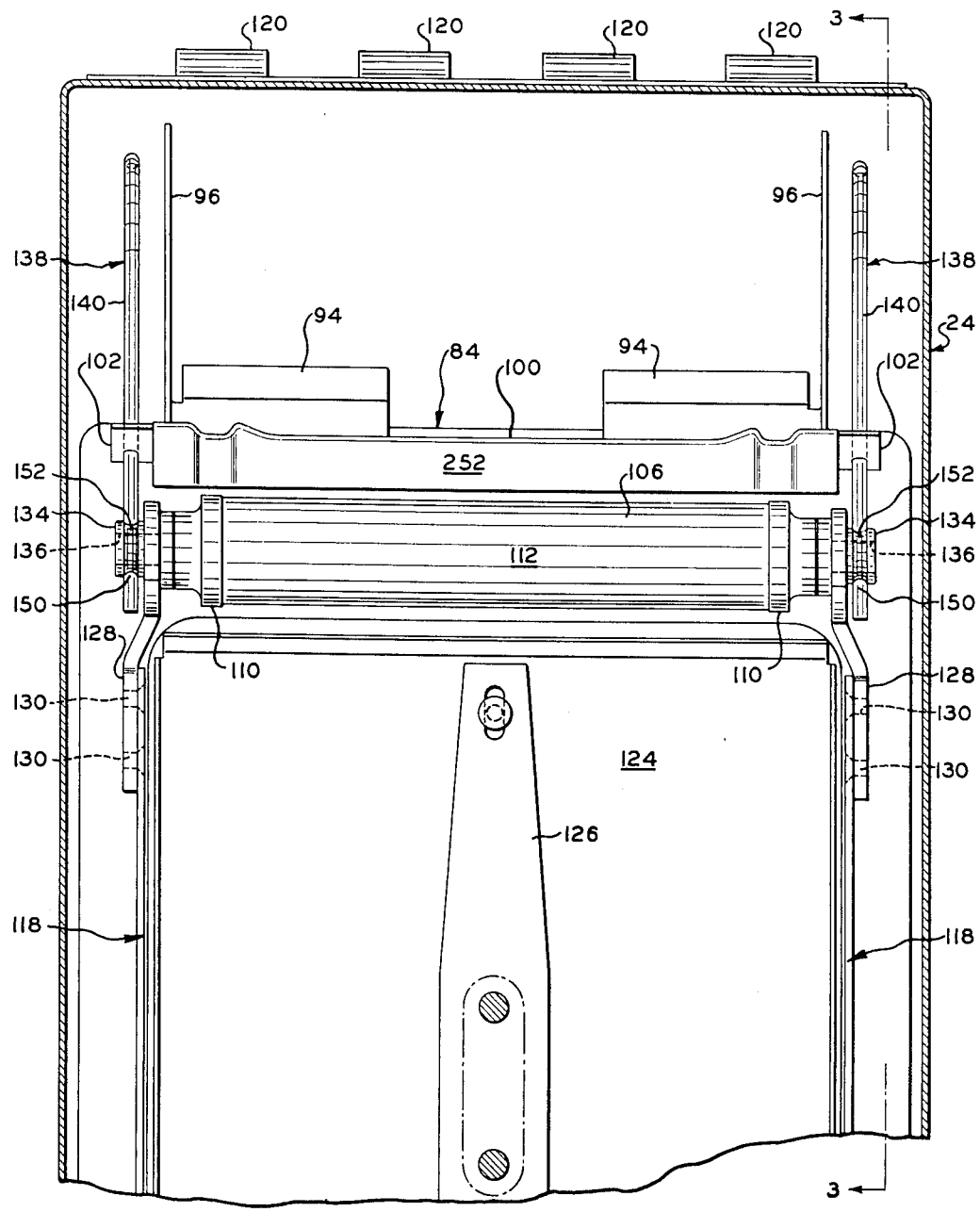
Fig. 2 is an enlarged, fragmentary, sectional view taken substantially along the line 2—2 of Fig. 1.
Figure 3:
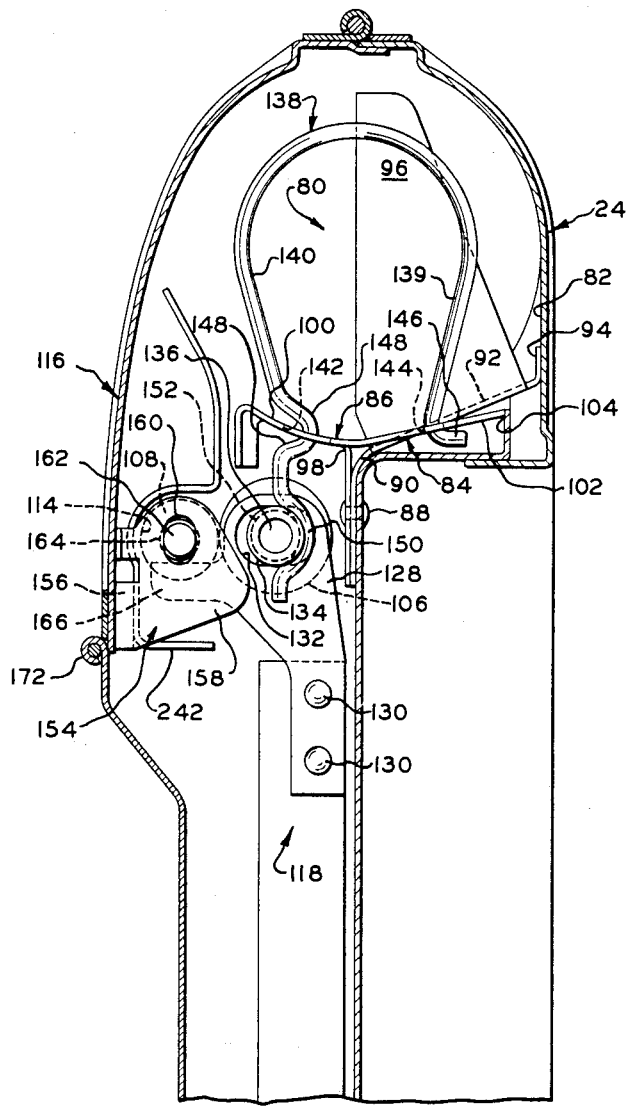
Fig. 3 is a fragmentary, sectional view taken substantially along the line 3—3 of Fig. 2.

Means are provided for mounting roll 72 within housing 20. As shown (Fig. 1), roll 72 is mounted in a compartment 80 having walls that are provided by a section 82 of front portion 24 and by various sections of a sheet metal member 84 and a sheet metal member 86. Details of members 84 and 86 are advantageously shown in Figs. 2 and 3. Member 84 is suitably fastened to front portion 24 as by means of a rivet 88 and is bent, as at 90, to provide a wall 92. Extending from wall 92 adjacent opposite edges thereof are a pair of flanges 94 (one of which is shown in Fig. 3) that are suitably connected to section 82. Extending from opposite edges of wall 92 are a pair of armlike walls 96 that are adapted to retain the opposite ends of roll 72. Member 86, like member 84, is fastened to front portion 24 as by means of rivet 88. Member 86 is bent, as at 98, to form a continuation 100 of wall 92. A pair of legs 102, which are struck up from the opposite edges of member 86, straddle walls 92 and 96 and are fastened to front portion 24 as at 104.

In accordance with the present invention, pressure-applying means are provided for processing latent images in frames of sheet 46. In the form thereof as shown, the pressure-applying means comprises a pair of rollers 106 and 108 between which sheets 46 and 70 may be advanced in superposed relation. Advancement of a frame of sheet 46 and an associated image-receiving area of sheet 70 between the rollers causes ejection of processing composition from the mouth of a container 74 and spreading of said processing composition between the sheets to form a sandwich in which the latent image in the frame is processed and a positive print is formed in the image-receiving area.

Roller 106 is provided (Fig. 2) with a pair of shouldered end portions 110 and an intermediate pressure-applying surface 112. Roller 108 is provided with a pressure-applying surface 114 (Fig. 3). When sheets 46 and 70 are advanced in superposition between rollers 106 and 108, shouldered end portions 110 are spaced from surface 112 by a distance equal to the combined thickness of sheets 46 and 70. Rollers 106 and 108 are so constructed that, under such circumstances, surface 112 is spaced from surface 114 by a distance equal to the combined thickness of sheets 46 and 70, plus a predetermined increment which determines the thickness of the layer of processing composition spread between the sheets.

In accordance with the present invention, means are provided which define an exposure chamber wherein latent images may be formed in frames of sheet 46 and a lighttight processing chamber into which a sandwich of portions of sheets 46 and 70 may be advanced from between rollers 106 and 108 and stored for a predetermined processing time. Said means, in the form shown, comprise a rear portion 116 and an intermediate portion 118 of housing 20. Viewing Fig. 1, rear portion 116 is pivotally attached to the upper extremity of front portion 24, as by means of a hinge 120, and intermediate portion 118 is pivotally attached to the lower extremity of front portion 24, as by means of a hinge 122. Portions 116 and 118, when in open position, provide access to the interior of the camera. When in closed position, portion 118 defines an exposure chamber in conjunction with front portion 24 and bellows 34. When in closed position, portions 116 and 118 define between their adjacent overlapping surfaces a processing chamber 123. A suitable latch means, partially shown at 121, is provided for securing portions 116 and 118 in closed position.

As a means for holding a portion of sheet 46 in exposure position on the guide surfaces, a pressure plate 124 (Figs. 1 and 2) is provided. As shown, plate 124 is mounted on intermediate portion 118 by a leaf spring 126, the central section of which is suitably connected, as at 127, to the intermediate portion and the ends of which are suitably connected, as at 129, to the plate.

In the illustrated embodiment, roller 106 (Fig. 3) is mounted on intermediate portion 118 and roller 108 is mounted on rear portion 116, the rollers being adapted to be predeterminedly arranged with respect to each other when portions 116 and 118 are in closed position and to be spaced apart to permit sheets 46 and 70 to be extended therebetween when portions 116 and 118 are in open position.

In order to generate pressure between rollers 106 and 108, means are provided for resiliently biasing roller 106 toward roller 108 when portions 116 and 118 are in closed position. As shown (Figs. 2 and 3), roller 106 is mounted on a pair of supports 128 which are positioned at opposite edges of the free end of intermediate portion 118 by such means as rivets 130. Each support 128 is provided with an elongated bearing slot 132 into which a slidable bushing 134 projects. Extending from opposite ends of roller 106 are a pair of stub shafts 136 which are received in bushings 134. By virtue of the slidable construction of bushings 134 in slots 132, roller 106 is movable longitudinally of slot 132 or, otherwise stated, is linearly movable toward and away from roller 108 when portions 116 and 118 are in closed position. The resilient biasing means, in the illustrated embodiment, comprises a pair of flexed, substantially U-shaped springs 138 (Figs. 2 and 3) which are mounted on opposite sides of housing 20, each spring being mounted between a wall 96 of member 84 and a side of front portion 24. Each spring 138 comprises a pair of legs 139 and 140. Springs 138 are mounted on opposite edges of member 86 with legs 140 extending into a pair of elongated slots 142 at opposite edges of continuation 100 and with legs 139 extending into a pair of slots 144 in legs 102. Hooked sections 146 and 148 of springs 138 are adapted to prevent dislodgment of legs 139 and 140 from slots 144 and 142, respectively. Slots 142 are sufficiently elongated to allow considerable movement of legs 140 toward and away from legs 139. Legs 140 are provided with arcuate extensions 150 which are adapted to engage peripheral grooves 152 on the peripheries of bushings 134. Viewing Fig. 3, if intermediate portion 118 is in open position, arcuate extensions 150 are spaced from bushings 134 and hooked sections 148 are resiliently urged into abutment with the left ends of slots 142. If intermediate portion 118 and rear portion 116 both are pivoted into closed position, arcuate extensions 150 engage bushings 134 and bias roller 106 against roller 108.

In the illustrated embodiment, effective spreading of processing composition 76 between sheets 46 and 70 is dependent upon the position and direction of the compressional forces exerted by rollers 106 and 108. In order that these compressional forces be correctly positioned and applied, it is desirable that the rollers be so arranged that their axes are parallel. In accordance with the present invention, aligning means, now to be described, are provided for arranging the rollers so that their axes are parallel when intermediate portion 118 and rear portion 116 are in closed position. As shown, roller 108 is mounted (Fig. 3) on rear portion 116 by such means as a cradle 154. Cradle 154 has a yoke 156 and a pair of legs 158, each of which is provided with an elongated bearing slot 160. Extending from the opposite ends of roller 108 are a pair of stub shafts 162 extending into slots 160. A bushing 164, shown in Fig. 3 in dotted lines, is mounted on each stub shaft between a leg 158 of cradle 154 and an end of roller 108. Extending from the supports 128 are a pair of fingers 166 which are adapted to abut against bushings 164 in order to align rollers 106 and 108 when intermediate portion 118 and rear portion 116 are in closed position. Viewing Fig. 3, advancement of sheets 46 and 70 between rollers 106 and 108 urges roller 108 downwardly with stub stafts 162 riding in vertically extending slots 160 until bushings 164 engage fingers 166.

In practice, sheet 46 extends from spool 47 (Fig. 1) past the guide surfaces surrounding aperture 28 and into contact with roller 106 (Fig. 1). Sheet 70 (Fig. 1) extends from roll 72 into contact with roller 108 and into superposition with sheet 46 to form therewith a sandwich which extends between the rollers and into processing chamber 123. Viewing Fig. 1, the lower sections of rear portion 116 and intermediate portion 118 are so constructed as to provide processing chamber 123 with an exit passage 168 through which portions of the sandwich positioned within the processing chamber may be removed therefrom. An operator, by grasping the leading portion of the sandwich extending from passage 168, may draw the sandwich through passage 168 and thereby may advance unprocessed portions of sheets 46 and 70 between rollers 106 and 108 and into processing chamber 123.

Thus, a frame of sheet 46, initially positioned for exposure adjacent to aperture 28, may be advanced toward registration with an image-receiving area of sheet 70. Continued advancement of sheets 46 and 70 between rollers 106 and 108 causes ejection of processing composition 76 from the container 74 associated with said frame and image-receiving area and causes spreading of the processing composition therebetween to form a sandwich. The frame and the image-receiving area advance from rollers 106 and 108 into processing chamber 123 and are permitted to remain therewithin for a predetermined time during which the latent image in the frame is processed and a positive print is formed in the image-receiving area.

A suitable closure means, such as a door 170 (Fig. 1), is provided to enable an operator to remove the undeveloped positive print from processing chamber 123. As shown, door 170 is pivoted, as at 172, to rear portion 116 of housing 20. Door 170 comprises an outer wall 174 and an inner wall 176. A suitable means is provided for latching door 170 in closed position, this means, in the form shown, comprising a carriage 180 slidable between walls 174 and 176. Extending from carriage 180 is a tongue 182 which is adapted to extend through a slot 184 in rear portion 116 when door 170 is in closed position. By such means as a button 186, which may be stamped out of carriage 180 and which extends through an elongated slot in wall 174, an operator may slide tongue 182 into slot 184 in order to latch door 170 in closed position or may slide tongue 182 out of slot 184 in order to permit the opening of door 170. An extension 190 of carriage 180 is provided with a detent 192 which is adapted to coact with a pair of depressions 194 in member 176 to fix tongue 182 in its latched or unlatched position. When an image-receiving area and a frame with which it is registered have remained in processing chamber 123 for a predetermined processing time, door 170 may be opened. The positive print now may be ripped from the remainder of sheet 70, the ripping being aided by a series of perforations (not shown) which separate the image-receiving area from the remainder of sheet 70, and at the same time may be stripped from the frame of sheet 46 with which it has been registered.

Since it is desirable that light be excluded from chamber 123 during the processing of a frame and an image-receiving area, a means is provided for rendering exit passage 168 lighttight. As shown, this means comprises a bar 196 (Fig. 1) pivoted to rear portion 116, as at 198, and having edge portions which, when bar 196 is in closed position, snugly contact portions of housing 20 that are adjacent to passage 168. The edge 202 of bar 196 normally is in contact with superposed sheets 46 and 70 extending from exit passage 168 and serves as a cutting blade by which an operator can sever portions of the sandwich extending through passage 168 from portions remaining within chamber 123.

Suitable shields are provided for excluding light from exposure chamber 123 when either or both door 170 and bar 196 are open. One such shield is shown at 240 (Fig. 1) as comprising a sheet metal element suitably affixed to yoke 156 of cradle 154. Viewing Fig. 1, the lower section of shield 240 is bent inwardly at 242 and normally contacts a surface of sheet 70 extending into chamber 123. The upper portion 244 of shield 240 acts to retain roll 72 within chamber 80.

In the operation of the illustrated camera, rear portion 116 and intermediate portion 118 are pivoted to open position to provide access to the interior of housing 20. Spool 47 is mounted on member 50 and roll 72 is inserted into compartment 80. Sheet 46 is drawn from spool 47 onto the guide surfaces surrounding aperture 28 and which position frames of sheet 46 in the focal surface of the lens of assembly 22. Sheets 46 and 70 now are superposed and are extended from roller 106 and along the rear surface of intermediate portion 118 to a point beyond the pivoted end thereof. Rear portion 116 now is pivoted to closed position in order to form processing chamber 123 and to adapt rollers 106 and 108 to be aligned. The leading ends of sheets 46 and 70 now are grasped and are drawn from processing chamber 123 until the leading frame of sheet 46 is in position for exposure. Viewing Fig. 3, advancement of sheets 46 and 70 between rollers 106 and 108 urges roller 108 downwardly with stub shafts 162 riding in vertically extending slots 160 until bushings 164 engage fingers 166 and the axes of the rollers are parallel. After exposure of the frame, an operator once again may grasp the leading ends of sheets 46 and 70 and may advance the sheets between rollers 106 and 108. During advancement of sheets 46 and 70 between rollers 106 and 108 and into processing chamber 123, processing composition 76 is ejected from the trailing edge of a container 74 and is spread between a frame of sheet 46 and an image-receiving area of sheet 70, the processing composition acting to process the frame and to form in the image-receiving area a positive print. When the superposed frame and image-receiving area have remained in processing chamber 123 for a predetermined processing period, door 170 is opened and the section of sheet 70 which carries the positive print is ripped from the remainder of sheet 70 and at the same time is stripped from the frame of sheet 46. As the exposure and processing cycle continues, portions of sheets 46 and 70 that extend through exit passage 168 may be evenly severed from the remainder of sheets 46 and 70 by means of edge 202 of bar 196.

It is to be expressly understood that the herein disclosed invention may be applied to photographic structures other than the camera herein illustrated. The invention, for example, may be applied to various processing units which are not directly associated with a photographic exposure means.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for processing an exposed photosensitive sheet, said apparatus comprising a housing, a first pressure-applying roller, a second pressure-applying roller, said pressure-applying rollers when operatively juxtaposed being adapted to superpose said photosensitive sheet on another sheet and to spread a layer of processing composition between said sheets, first mounting means, first connecting means for associating said first mounting means with said housing, first shaft means extending from opposite ends of said first pressure-applying roller, said first shaft means being carried by said first mounting means, the axis of said first shaft means being movable with respect to said first mounting means, second mounting means, second connecting means for associating said second mounting means with said housing, second shaft means extending from opposite ends of said second pressure-applying roller, said second shaft means being carried by said second mounting means, said first and second mounting means being movable with respect to each other into predetermined relative positions, and aligning means mounted on said second mounting means in predetermined spatial relation to said second roller and interconnecting with said first shaft means when said first mounting means and said second mounting means are in predetermined relative positions in order to parallelize said first roller with said second roller and thereby to compensate for structural inaccuracies in said housing, said mounting means and said connecting means.

2. Photographic apparatus for processing an exposed photosensitive sheet, said apparatus comprising a housing, a first pressure-applying roller, a second pressure-applying roller, said pressure-applying rollers when operatively juxtaposed being adapted to superpose said photosensitive sheet on another sheet and to spread a layer of processing composition between said sheets, first mounting means, first connecting means for associating said first mounting means with said housing, first shaft means extending from opposite ends of said first pressure-applying roller, said first shaft means being carried by said first mounting means, the axis of said first shaft means being movable with respect to said first mounting means, second mounting means, second connecting means for associating said second mounting means with said housing, second shaft means extending from opposite ends of said second pressure-applying roller, said second shaft means being carried by said second mounting means, said first and second mounting means being movable with respect to each other into predetermined relative positions, and finger means carried by said second mounting means, said finger means being predeterminedly located with respect to said second shaft means and acting to operatively connect with said first shaft means in order to operatively juxtapose said pressure-applying rollers when said first and second mounting means are in said predetermined relative positions.

3. Photographic apparatus for processing an exposed photosensitive sheet, said apparatus comprising a housing, a first pressure-applying roller, a second pressure-applying roller, said pressure-applying rollers when operatively juxtaposed being adapted to superpose said photosensitive sheet on another sheet and to spread a layer of processing composition between said sheets, first mounting means, first connecting means for associating said first mounting means with said housing, first shaft means extending from opposite ends of said first pressure-applying roller, said first shaft means being carried by said first mounting means, the axis of said first shaft means being movable with respect to said first mounting means, second mounting means, second connecting means for associating said second mounting means with said housing, second shaft means extending from opposite ends of said second pressure-applying roller, said second shaft means being carried by said second mounting means, said first and second mounting means being movable with respect to each other into predetermined relative positions, and a pair of fingers carried by said second mounting means, said fingers acting to abut against said first shaft means on opposite sides of said first roller in order to parallelize the axes of said pressure-applying rollers when said first and second mounting means are in said predetermined relative positions.

4. A photographic apparatus of the type wherein a photosensitive sheet is exposed and thereafter processed, said apparatus comprising a housing having a front portion and a rear portion, said front portion being provided with a lens and a shutter, guide means on said front portion adapted to position said photosensitive sheet in the focal surface of said lens, pivot means for connecting said rear portion to said front portion on one side of said guide means, a mounting means, pivot means for connecting said mounting means to said front portion on the opposite side of said guide means, a first pressure-applying roller, a second pressure-applying roller, said pressure-applying rollers when operatively juxtaposed being adapted to superpose said photosensitive sheet on another sheet and to spread a layer of processing composition between said sheets to form a sandwich, said rear portion and said mounting means when in open position providing access to the interior of said housing, said mounting means when in closed position defining in conjunction with said front portion an exposure chamber, said rear portion and said mounting means when in closed position defining a processing chamber adapted to receive said sandwich, first shaft means extending from opposite ends of said first pressure-applying roller, said first shaft means being carried by said rear portion, the axis of said first shaft means being movable with respect to said rear portion, second shaft means extending from opposite ends of said second pressure-applying roller, said second shaft means being carried by said mounting means, and aligning means mounted on said mounting means, said aligning means being operatively connected with said first shaft means for compensating for structural inaccuracies in said housing, said mounting means and said pivot means in order to operatively juxtapose said pressure-applying rollers when said rear portion and said mounting means are in closed position.

5. A photographic apparatus of the type wherein a photosensitive sheet is exposed and thereafter processed, said apparatus comprising a housing having a front portion and a rear portion, said front portion being provided with a lens and a shutter, guide means on said front portion adapted to position said photosensitive sheet in the focal surface of said lens, pivot means for connecting said rear portion to said front portion on one side of said guide means, a mounting means, pivot means for connecting said mounting means to said front portion on the opposite side of said guide means, a first pressure-applying roller, a second pressure-applying roller, said pressure-applying rollers when operatively juxtaposed being adapted to superpose said photosensitive sheet on another sheet and to spread a layer of processing composition between said sheets to form a sandwich, said rear portion and said mounting means when in open position providing access to the interior of said housing, said mounting means when in closed position defining in conjunction with said front portion an exposure chamber, said rear portion and said mounting means when in closed position defining a processing chamber adapted to receive said sandwich, first shaft means extending from opposite ends of said first pressure-applying roller, said first shaft means being carried by said rear portion, the axis of said first shaft means being movable with respect to said rear portion, second shaft means extending from opposite ends of said second pressure-applying roller, said second shaft means being carried by said mounting means, and a pair of fingers carried by said mounting means, said fingers being arranged to abut against said first shaft means in order to parallelize the axes of said pressure-applying rollers when said rear portion and said mounting means are in closed position.

6. A photographic apparatus of the type wherein a photosensitive sheet is exposed and thereafter processed, said apparatus comprising a housing having a front portion and a rear portion, said front portion being provided with a lens and a shutter, guide means on said front portion adapted to position said photosensitive sheet in the focal surface of said lens, pivot means for connecting said rear portion to said front portion on one side of said guide means, a mounting means, pivot means for connecting said mounting means to said front portion on the opposite side of said guide means, a first pressure-applying roller, a second pressure-applying roller, said pressure-applying rollers when operatively juxtaposed being adapted to superpose said photosensitive sheet on another sheet and to spread a layer of processing composition between said sheets to form a sandwich, said rear portion and said mounting means when in open position providing access to the interior of said housing, said mounting means when in closed position defining in conjunction with said front portion an exposure chamber, said rear portion and said mounting means when in closed position defining a processing chamber adapted to receive said sandwich, first shaft means extending from opposite ends of said first pressure-applying roller, said rear portion having a pair of elongated slots, the ends of said first shaft means being received by said elongated slots so that the axis of said first shaft means is movable with respect to said rear portion, second shaft means extending from opposite ends of said second pressure-applying roller, said second shaft means being carried by said mounting means, and a pair of fingers carried by said mounting means, said fingers being arranged to abut against said first shaft means in order to parallelize the axes of said pressure-applying rollers when said rear portion and said mounting means are in closed position.

7. In a photographic apparatus for processing an exposed photosensitive sheet, a pair of pressure-applying rollers adapted to superpose said photosensitive sheet on another sheet and to spread a layer of processing composition between said sheets, a first mounting means, a second mounting means, one of said rollers being mounted on said first mounting means, the other of said rollers being mounted on said second mounting means, said first and second mounting means being movable with respect to each other into predetermined relative positions, said one of said rollers being movable on said first mounting means in a first direction, said other of said rollers being movable on said second mounting means in a second direction, said second direction being substantially toward said first roller and said first direction being substantially perpendicular to said second direction when said first and second mounting means are in said predetermined relative positions, aligning means mounted on said second mounting means in predetermined relation with said second roller and acting to operatively interconnect with said first roller when said first and second mounting means are in said predetermined relative positions in order to parallelize said first roller and said second roller, and resilient means for urging said second roller in said second direction toward said first roller when said first and second mounting means are in said predetermined relative positions.

8. In a photographic apparatus for processing an exposed photosensitive sheet, a pair of pressure-applying rollers adapted to superpose said photosensitive sheet on another sheet and to spread a layer of processing composition between said sheets, a first mounting means, a second mounting means, first shaft means for rotatably mounting one of said rollers on said first mounting means, second shaft means for rotatably mounting the other of said rollers on said second mounting means, said first shaft means being movable with respect to said first mounting means in a first direction, said second shaft means being movable with respect to said second mounting means in a second direction, said first and second mounting means being movable with respect to each other into predetermined relative positions, said second direction being substantially toward said first roller and said first direction being substantially perpendicular to said second direction when said first and second mounting means are in said predetermined relative positions, a pair of fingers affixed to said second mounting means, said fingers being operatively connected to said first shaft means at opposite ends of said first roller when said first and second mounting means are in said predetermined relative position, and resilient means operatively connected to said second shaft means to urge said second roller toward said first roller in said second direction when said first and second mounting means are in said predetermined relative positions.

9. Photographic apparatus for processing an exposed photosensitive sheet, said apparatus comprising a housing, a first pressure-applying member, a second pressure-applying member, said first pressure-applying member and said second pressure-applying member, when operatively juxtaposed, being adapted to superpose said first photosensitive sheet on another sheet and to spread a layer of processing composition between said sheets, first mounting means, first connecting means for associating said first mounting means with said housing, a first pair of opposed elements extending from opposite ends of said first pressure-applying member, said first pair of opposed elements being carried by said first mounting means, said first pair of opposed elements having an axis movable with respect to said first mounting means, second mounting means, second connecting means for associating said second mounting means with said housing, a second pair of opposed elements extending from opposite ends of said second pressure-applying member, said second pair of opposed elements being carried by said second mounting means, said first mounting means and said second mounting means being movable with respect to each other into predetermined relative positions, and aligning means mounted on said second mounting means in predetermined spatial relation to said second pressure-applying member and interconnecting with said first pair of opposed elements when said first mounting means and said second mounting means are in said predetermined relative positions in order to parallelize said first pressure-applying member with said second pressure-applying member.

References Cited in the file of this patent

UNITED STATES PATENTS 2,458,186    Messina ---------------- Jan. 4, 1949